Patented Apr. 26, 1949

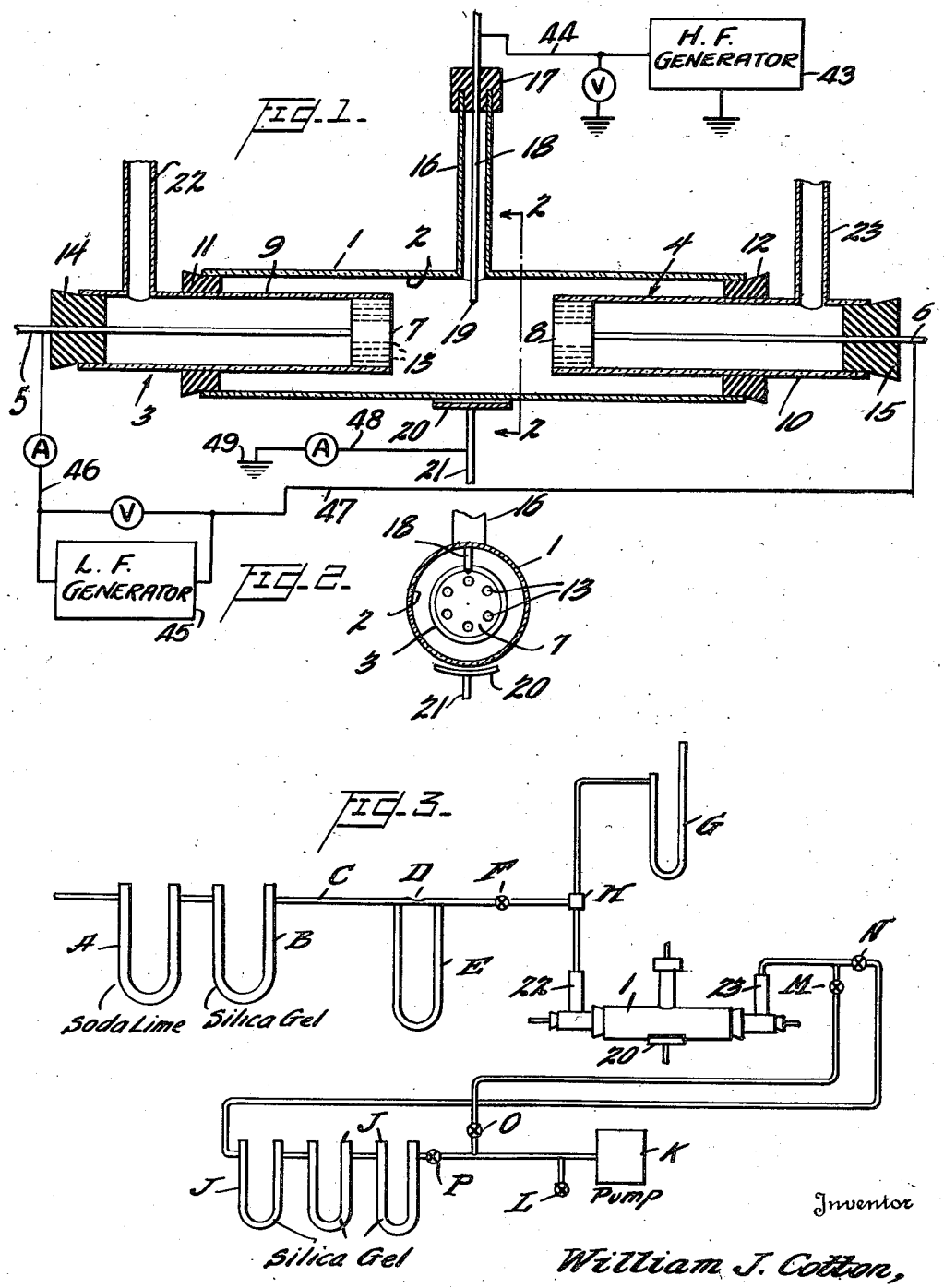

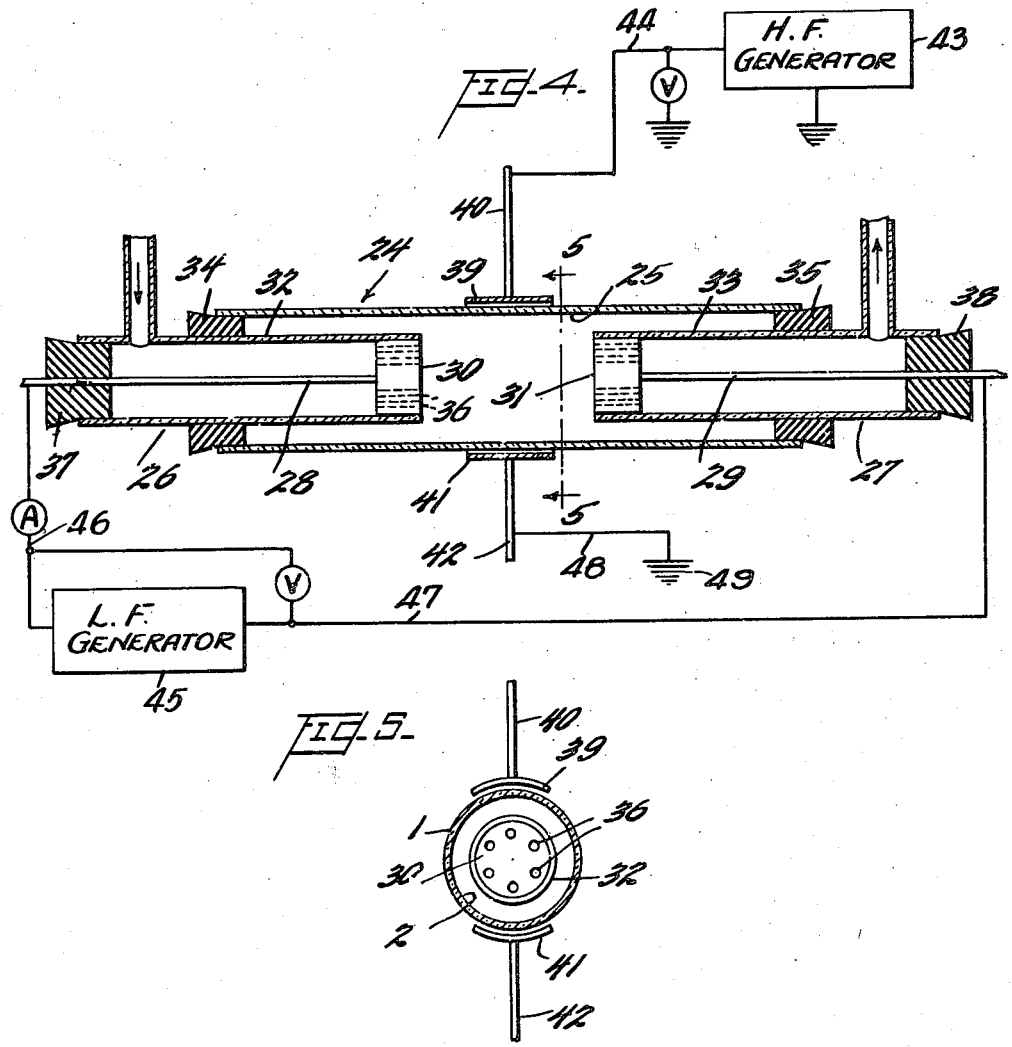

2,468,173

UNITED STATES PATENT OFFICE 2,468,173

APPARATUS FOR THE ELECTROCHEMICAL TRANSFORMATION OF MATERIALS

William J. Cotton, Chicora, Pa. assignor, by mesne assignments, to Koppers Company, Inc., a corporation of Delaware Application April 29, 1943, Serial No. 485,058

12 Claims. (Cl. 204—312)

This invention relates to a reactor apparatus wherein gaseous material may be subjected to a plurality of crossed electrical discharges generated by crossed electrodes supplied with electrical energy of substantially different frequencies, one pair of electrodes being supplied with low frequency energy, and the other pair of electrodes being supplied with high frequency energy.

The object of the present invention is to provide a simple, compact reactor apparatus adapted to efficiently and economically effect transformation of gaseous materials, said reactor apparatus being provided with a reactor chamber and a pair of electrodes having energy of one frequency passing therethrough, said pair of electrodes cooperating with a second pair of electrodes having electrical energy of different frequency passing therethrough, at least one electrode of one pair of electrodes being external to said reactor chamber. While both electrodes of one pair of electrodes may be external, and the other pair internal, in the preferred form of the invention one pair of electrodes is internal and one electrode of the second pair of electrodes is external.

Another object of the present invention is to provide an apparatus of the character set forth wherein all or some of the internal electrodes are provided with sheath members functioning to protect the reactor chamber from the heat that may be generated during the course of the electrochemical reaction, said sheath members having the further function of directing the flow of gaseous material being treated into the composite discharge and around the electrode tips.

Still another object of the present invention is to provide a reactor apparatus in which the external electrode is spaced from the wall of the rector chamber to inhibit any substantial heating of the wall of the reactor chamber. In attaining this object, it is preferable that the external electrode be spaced from the reactor wall.

A further object of the present invention is to arrange the external electrode centrally of the internal cooperating electrode so that any corona discharge emanating from the cooperating internal electrode is drawn centrally downward between the cooperating internal electrode terminals.

A further object of the present invention is to provide a reactor apparatus of the character set forth in which at least one of the internal electrodes has a different ion emission potential than that of the remainder of the internal electrodes.

The reactor of the present invention is designed to use high frequency energy varying from about 60,000 cycles to 300,000 mc., or over, in conjunction with a low frequency energy which may vary from the lowest producible frequency, including 10, 25 and 60 cycles, to about 3,000 mc., said low frequency energy corresponding to a variation in wave length from about 3,000,000 meters for 10 cycles to 10 centimeters for 3,000 mc. The high frequency energy may be generated by an alternating current or by any other means now known in the art.

It is clear from the above that the present reactor apparatus is designed for the electrochemical transformation of materials wherein the two frequencies supplied to the crossed electrodes differ substantially in numerical value one from the other. The order of the difference is that the crossed frequencies simultaneously acting on a chemical material and transforming said chemical material, should produce an increase in yield of the final reaction product over the yield that would be produced in using only the particular low frequency of the crossed electrodes or in using only the particular high frequency of the crossed electrodes.

In accordance with the present invention, there is provided a reactor apparatus wherein by crossing low frequency energy and high frequency energy, the volume of the visible composite resulting discharge per unit of total energy supplied is greatly increased; that is, the energy density of the composite discharge in watts per cubic centimeter is greatly decreased. Stated differently, the reactor of the present invention is characterized by the property, when operating, of producing a composite discharge which fills a larger volume than would be filled by the low frequency electrodes operating separately or the high frequency electrodes operating separately, when each of said electrodes is supplied with energy equal to the total energy supplied to the crossed electrodes.

The present invention will be disclosed in connection with the accompanying drawings, in which Fig. 1 is a cross-sectional view of a reactor constructed in accordance with the present invention, said reactor being provided with a pair of low frequency internal electrodes, and a pair of high frequency electrodes, one of which is an internal electrode and the other is an external electrode;

Fig. 2 is a transverse cross-sectional view taken on the line 2—2 looking in the direction of the arrows in Fig. 1;

Fig. 3 is a diagrammatic representation of an apparatus for drying the air prior to its introduction into the reactor of Fig. 1, and of recovering the products of the reaction;

Fig. 4 is a cross-sectional view of a modified reactor apparatus in which both of the high frequency electrodes are external electrodes; and Fig. 5 is a transverse cross-sectional view taken on the line 5—5 looking in the direction of the arrows in Fig. 4.

The reactor apparatus as shown in Fig. 1 comprises a hollow reactor vessel 1 having an interior wall 2, said reactor vessel being made of non-conducting or insulating material, such as a ceramic material, including glass, and preferably a high melting glass, as exemplified by Pyrex. Within the reactor vessel 1 are positioned units 3 and 4, provided with electrode leads 5 and 6, said leads having button-like electrode terminals 7 and 8, which are made of a good conducting material, exemplified by metal or metal alloys which will not oxidize appreciably to such an extent as to destroy the function of the electrodes during the course of the reaction. The material of the electrodes will depend to a substantial extent upon the sustaining voltage required to maintain the composite discharge. As stated, the electrode material must not appreciably oxidize or melt at the temperature used during operating conditions. The electrode buttons or equivalent electrodes may consist of copper, silver, brass, iron, nickel, chromium, aluminum, iron and chromium alloys, nickel and chromium alloys, or the like, tantalum, tungsten, tungsten alloys or tantalum alloys, platinum, platinum alloys, and carbon. The tantalum electrodes are capable of withstanding relatively high sustaining voltages without any substantial oxidation. While tungsten is not suitable for oxidation reactions, it may be employed in treating such chemicals or such compounds or mixture of compounds where oxidation is not present. However, where ammonia is subjected to the crossed discharge under the conditions specified, tungsten may be used for either the high frequency or low frequency electrodes, or for both. The electrode terminals may be made of copper alloyed with about 2% of lithium, as is well known in the prior art.

The buttons 7 and 8 are mounted in sheaths 9 and 10, which are positioned centrally of the reactor vessel 1. These sheaths are mounted in and pass through airtight insulating supports 11 and 12, which may be made of rubber, cork, or similar material. The button electrodes 7 and 8 are provided with a plurality of passageways 13 which function to split the reacting gaseous medium into a plurality of pencil-like streams, so as to better insure the contact of the gaseous medium being treated with the composite discharge. The outer ends of the sheaths 9 and 10 are respectively closed with tight insulating closures 14 and 15. The reactor vessel has sealed into its wall a tubular member 16 closed at its outer end with a closure member 17 which is perforated and through which there passes the high frequency electrode 18, which is made of any of the materials herein set forth. The reactor apparatus is preferably provided with an external electrode 21 having a terminal 20, said electrode being made of a conducting material. Preferably the electrode terminal consists of a suitable sheet of metal, such as copper, shaped to the contour of the reactor vessel 1 so as to preferably close a discharge varying from 40° to 80° with the tip 19 of the internal electrode, said tip serving as a center of curvature. The external electrode terminal 20 is shaped to draw the corona discharge emanating from the electrode terminal tip 19 centrally downwardly between the button electrodes 7 and 8, thereby insuring maximum efficiency and yield. The external electrode terminal 20 may be placed in direct contact with the outer wall of the reactor vessel or tube 1 but is preferably spaced at such a distance from the external wall of the reactor vessel as to inhibit any substantial heating of the wall. In practice, it has been found that, if the external terminal 20 is from 1 to 2 mm. from the external wall of the reactor vessel, satisfactory results are obtained.

It is desired to point out that the reactor depicted in Fig. 1 need not necessarily be mounted in the position shown, but that it may be turned to any convenient angle and even inverted.

Referring to Figs. 4 and 5, the reactor therein set forth is constructed similarly to the reactor set forth in Fig. 1 except that two external electrodes are provided instead of one. The reactor shown in Figs. 4 and 5 comprises a hollow reactor vessel 24 having an interior wall 25, said reactor vessel being made of ceramic material. Within the reactor vessel or chamber are positioned units 26 and 27 provided with electrode leads 28 and 29, said leads having button-like electrodes 30 and 31 made of good conducting material, exemplified by metal or metal alloys which will not oxidize appreciably so as to destroy the function of the electrodes during the course of the reaction.

The buttons 30 and 31 are mounted in sheaths 32 and 33, which are positioned centrally of the reactor vessel 1. These sheaths are mounted in and pass through airtight insulating supports 34 and 35 respectively, said insulating members being made of rubber, cork, or the like. The buttons 30 and 31 are provided with a plurality of passageways 36 which function to split the reaction gaseous medium into a plurality of pencil-like streams. The outer ends of the sheaths 26 and 27 are respectively closed with tight insulating closures 37 and 38.

The reactor apparatus is provided with an external electrode 40 having a terminal 39 and a second external electrode 42 having a terminal 41. Preferably both electrode terminals consist of a suitable sheet of any conducting metal or alloy, and copper is preferably used. The electrode terminals 39 and 41 are preferably shaped to the contour of the reactor vessel 24. Each electrode terminal may be placed in direct contact with the outer wall of the reactor vessel or tube 24, but is preferably spaced at such a distance from the external wall of the reactor vessel as to inhibit any substantial heating of the wall. In practice, it has been found that each electrode may be spaced from 1 to 2 mm. from the external wall of the reactor vessel.

The material treated in the apparatus shown in Figures 1 and 2 is in a gaseous state and is dried in the manner hereinafter set forth. The reactor apparatus which is the subject matter of the present invention may be used for producing nitrogen oxides by passing through the reactor vessel a nitrogen- and oxygen-containing medium adapted to produce nitrogen oxides upon being subjected to the action of crossed discharges supplied with electrical energy of the character herein set forth. In effecting the electrochemical transformation of air to produce nitric oxide, the air enters through the inlet 22, passes through the sheath 3, the button electrode 7, and through the composite crossed discharge.

The reaction product passes through the electrode terminal 8 and sheath 10, and leaves the reactor vessel by means of the exit conduit 23. The reaction product passes through a medium for extracting its nitric oxide content, the precise method of extraction being hereinafter set forth.

It is desired to point out that for the button electrodes 7 and 8 there may be substituted sharpened or pointed electrodes. When the electrode terminals are in the shape of sharpened points, the sheaths 9 and 10 may be omitted, but it is highly desirable to retain them in order to force the flow of the gaseous medium being subjected to the action of the composite discharge in and around the electrode tips. Further, it is desired to point out that the sheaths 9 and 10 function to a large extent to protect the outer vessel 1 from the effect of heat that may be produced during the course of the reaction.

The following is a specific example illustrating the production of nitric oxide from atmospheric air:

The diameter of the reactor vessel 1 is 32 mm. The inner sheaths 9 and 10 are approximately 23 mm. in diameter. The overall length of the tube is 10". The flow of dried air is initiated through the inlet member 22, said air passing through the reactor vessel 1 at a velocity of 356 cc. per minute standard conditions, the pressure within the reactor vessel being maintained at 174 mm. of mercury. There is applied to the high voltage low frequency electrode terminals 7 and 8 a voltage of 2160 volts. The electrode terminals are spaced 60 mm. apart. When employing a brass internal high frequency electrode 18 and a wave length of 142 meters, there is applied to the high frequency terminals 19 and 20 a high frequency tension or potential of about 2050 volts. A wave length of 142 meters corresponds to a frequency of 2.11 mc. As soon as the high frequency potential has been applied to the high frequency electrodes, the high frequency discharge will strike and this will function to initiate the striking of the high voltage low frequency discharge. Immediately upon the striking of the high voltage discharge, its potential drops to approximately 800 volts. Also when the high voltage low frequency discharge strikes, its voltage likewise markedly drops. Should either discharge fail to strike promptly, striking may be readily induced by the use of a Lepel coil as a tickler in the usual manner. In this particular example, the low freqency discharge strikes immediately, whereupon the voltage across the terminals drops to approximately 800 volts. The current of the low frequency discharge approximates 120 milliamperes (ma.), while the current of the high frequency discharge approximates 30 ma., as measured on the thermomilliammeter in the power amplifier plate circuit of the high frequency generator. The exit gases leave the reactor through the exit conduit 23, said exit gases comprising a predominating quantity of nitric oxide NO, unreacted quantities of nitrogen and oxygen and traces of nitrogen dioxide $NO_2$, and nitrogen tetroxide $N_2O_4$.

In this experiment the low frequency electrode terminals consist of an alloy comprising copper and 2% lithium. The exit gasts of the character set forth pass with relatively high speed through the relatively short exit member to silica gel absorbers, where the nitrogen oxides are absorbed and the increase in weight noted, the specific apparatus being set forth in Fig. 3.

It is within the province of the present invention to have the low frequency electrodes and the electrode terminals made of one material, such as copper, and the high frequency electrodes and the electrode terminals made of another material, such as nickel, to thereby provide electrodes and electrode terminals of different ion emission potentials. It is further within the province of the present invention to make each of the electrodes and electrode tips of different conducting metals or alloys so as to provide electrode tips, each chosen to have its own selective ion emission potential.

The crossed electrodes as shown in the drawing are all in the same plane, and said plane may be a vertical plane, a horizontal plane, or any intermediate plane. The reactor shown in the drawing may be provided with an additional pair of either high frequency or low frequency electrodes, said additional pair of electrodes being either internal electrodes or external electrodes. The additional pair of low frequency electrodes may have the same low frequency energy passing therethrough which passes through the low frequency electrodes 5 and 6, or the frequency of the energy passing through the additional electrodes may be greater or less than that supplied to the electrodes 5 and 6. The additional supplemental set of electrodes may be high frequency electrodes, and then the high frequency energy supplied thereto may be the same, greater or less than the high frequency energy supplied to the high frequency electrodes 18 and 21. The additional set of electrodes may be positioned at any angle to either of the other pairs of electrodes. This arrangement may be called the "triple electrode" arrangement.

The air is dried prior to its introduction to the reactor vessel 1 by passing it through the soda lime tube A, then through the silica gel tube B, thence through the conduit C, through the orifice D of the differential manometer E, through the valve F, and thence to the reactor 1. At the point H is connected the mercury manometer G which measures the internal pressure of the reactor. From the reactor 1 the exit gases pass through exit conduit 23 to a series of silica gel absorber tubes J, which tubes extract the nitric oxide content of the exit gases. A vacuum is applied by means of the vacuum pump K and the amount of vacuum adjusted by means of the release valve L and the main valve F in the supply line. The soda lime functions not only to take out a portion of the moisture but also to extract from the air substantially all of the carbon dioxide. The air as delivered to the reactor 1 has a moisture content of about 5 to 8 mg. of moisture per liter. When the run is started, the valves N and P are closed and M and O are open. When operation has reached equilibrium, valves N and P are quickly opened and valves M and O closed, noting the time of doing so with a stopwatch. Upon conclusion of the run, valves M and O are opened while N and P are closed.

The time interval during which the valves N and P are open to the absorbers and the valves M and O of the by-pass are closed is six minutes. During this period the silica gel is absorbing the nitric oxide produced by the reaction. After the run is terminated, the silica gel tubes are weighed and the increase in weight taken as the weight of nitric oxide produced in the six minutes. In this example, there was produced, under the operating conditions above described for a period of six minutes, 259.0 mg. of nitric oxide. The yield on this data calculates to 144.4 grams of nitric acid per kilowatt hour. While in this particular experiment, where the reaction pressure is less than one-half atmosphere, the gas is absorbed in the silica gel, when the pressure is in excess of one-half atmosphere the reaction gas may be passed into a balloon flask, where the gas is retained for a sufficient length of time to permit the nitric oxide content of the gas to be converted to $N_2O_3$ and/or $N_2O_4$. From the balloon flask the gas may be drawn through an accurately measured volume of standardized caustic soda contained in bubble absorbers, and thereafter the excess of unreacted caustic soda titrated.

In the example set forth the electrical discharge is visible, partaking of the characteristics of both the glow and the corona types of discharges. If the pressure at which the reaction is carried out is above about one-half atmosphere, the discharge approaches more nearly the corona type of discharge, but at pressures below about one-half atmosphere the characteristics of a glow type discharge begin to become more pronounced as the pressure decreases. This pressure may be decreased until it approaches a vacuum as a lower limit.

The reactor may be operated with crossed discharges, one set of electrodes producing a silent discharge and the other set of electrodes producing either a corona or glow discharge. More specifically, in operating the reactor of the present invention, there may be a discharge between either the low frequency electrodes or the high frequency electrodes, and the discharge between the other pair of electrodes may be a silent discharge. The discharge may be a glow discharge.

The reactor apparatus herein set forth may be used to effect the transformation of aliphatic, aromatic, or cyclic hydrocarbons, or heterocyclic compounds. More specifically, the apparatus may be used to effect the transformation of aldehydes, ketones, alcohols, esters, ethers, acids and bases, as well as substitution products and derivatives thereof.

Referring to Fig. 4, setting forth a reactor having two external high frequency electrodes, only one type of high frequency discharge is possible, namely, a silent discharge. However, between the low frequency electrode terminals 30 and 31 any type of discharge may be generated, depending upon the conditions and the method of operation.

In a reactor such as set forth in Fig. 1 a spark discharge between the high frequency electrodes is not practicable, as the spark almost immediately punctures the wall of the reactor chamber. Therefore, in operating a reactor of the type shown in Fig. 1, the conditions of operation should be adjusted so that a spark discharge does not occur between the high frequency electrodes. With a reactor of the type set forth in Fig. 1, two types of discharges are feasible between the high frequency electrodes, namely, a corona discharge and a glow discharge. The factors which determine which kind of discharge is obtained are frequency, amount of discharge as measured in terms of milliamperes and voltage, and pressure. To some extent, the electrode material also determines the type of discharge obtained. In general, however, if all factors remain constant, then as pressure increases above about one-half atmosphere, the tendency will be to shift from the glow to the corona discharge; and as the pressure decreases below one-half atmosphere, the tendency will be in the reverse direction, namely, towards a glow discharge. In the experiment herein set forth, operating under a pressure of 174 mm. of mercury, the discharge partook of the characteristics of both the corona and glow types of discharges.

In connection with the above, it is desired to point out that, using crossed discharges, the discharge very frequently partakes of the character of both a glow and corona discharge. However, under the particular conditions at which the herein set forth experiment was carried out, below about one-half atmosphere the tendency was for the glow discharge to predominate, and above about one-half atmosphere there was a tendency for the crossed discharge to be a composite medium, which is the result of glow and corona discharges, in which the corona discharge predominates. However, under some circumstances, the reactors herein disclosed, and, in general, reactors using crossed discharges generated by high frequency and low frequency energy of the character herein set forth, may be operated to give either glow or corona discharges above one-half atmosphere, or to give either glow or corona discharges below one-half atmosphere.

Referring to the type of reactor set forth in Fig. 1, between the low frequency electrodes any type of discharge can be utilized, and therefore the composite discharge may be the result of a silent discharge between the low frequency electrodes and a corona discharge between the high frequency electrodes; or that obtained by a spark discharge between the low frequency electrodes and a glow discharge between the high frequency electrodes; or that obtained when there is a corona discharge from both pairs of electrodes; or that obtained when there is a glow type of discharge from both of the electrodes.

By "glow discharge" is meant a discharge which consists of a soft diffusion of light throughout the entire volume of space between the electrodes. This may be, although not necessarily, simultaneously accompanied by an almost complete lack of incandescence of the electrodes themselves. The glow discharge does not have a definite boundary, as is characteristic of the corona discharge. The glow is not usually of uniform intensity throughout the volume between the electrodes, the intensity being greater along the axis between the electrodes and tapering off gradually to the confines of the reactor tube.

If the energy supplied be increased, the electrodes will become incandescent without appreciably affecting the glow characteristics of the discharge.

The corona discharge emanating from the internal high frequency electrode possesses rather definite boundary characteristics, and appears as an ovoid, or a bush-like projection, extending downwardly toward the external high frequency electrode.

The internal electrodes of the reactor apparatus may act as a catalyzer. Further, a catalyst may be inserted in the zone of the crossed discharge, said catalyst being supported upon an insulating mount and assisting in effecting the desired chemical transformation. Preferably, the interior of the supporting mounting is electrically heated by interior leads, to heat and thereby activate the catalyst which may be supported upon a carrier. The catalyst may be a composite catalyst. Referring to Fig. 1, it is to be noted that the electrodes 18 and 21 and their electrode terminals 19 and 20, respectively, are disposed in a zone bounded by terminals 7 and 8 of the electrodes 5 and 6, respectively. In other words, the pairs of electrodes are transversely arranged one with respect to the other so that the discharge generated by the first pair of electrodes crosses, intersects and merges with the discharge generated by the second pair of electrodes.

The hook-up of the high frequency generating unit used for producing the high frequency energy supplied to the tank circuit connecting the generator and the reactor and the tank circuit used in carrying out experiment 1 is set forth in copending application Serial No. 483,931, filed April 21, 1943, now abandoned.

Means are provided as shown in Figures 1 and 4 for producing the high frequency and low frequency discharges.

Referring to Figure 1, there is provided a high frequency generator 43 connected to the high frequency electrode 18 by means of a lead 44. The high frequency electrode 21 is connected to the ground 49 by the lead 48. The low frequency generator 45 is connected to the low frequency electrodes 5 and 6 by leads 46 and 47 respectively. The connections for the reactor set forth in Figure 4 are substantially identical.

What is claimed is:

1. In an electrode reactor apparatus adapted to effect the electrochemical transformation of gaseous material, a dielectric reactor chamber having an electrical composite discharge-zone formed between its electrodes, means for introducing reacting material into the reactor chamber, means for discharging the transformed material from the reactor chamber, a pair of electrodes including their discharge terminals disposed internally in said reactor chamber, a second pair of electrodes cooperatively disposed with respect to the first pair of electrodes, one of said second pair of electrodes and its discharge terminal being located internally of the reactor and the other electrode and its terminal being disposed externally to said reactor chamber, said external electrode terminal conforming substantially to the contour of the reactor wall and being spaced therefrom, said pairs of electrodes being disposed to provide for the electrical discharge between the first pair of electrodes crossing the electrical discharge between the second pair of electrodes, means for supplying said first pair of electrodes with electrical energy of one frequency, and separate means for simultaneously supplying the second pair of electrodes with cyclic energy of another frequency.

2. In an electrode reactor apparatus adapted to effect the electrochemical transformation of gaseous material, a dielectric reactor provided with a chamber having an electrical discharge-zone formed between its electrodes, means for introducing reacting material into the reactor chamber, means for discharging the transformed material from the reactor chamber, a pair of electrodes including their discharge terminals positioned internally in said reactor chamber, a second pair of electrodes cooperatively disposed with respect to the first pair of electrodes, one of said second pair of electrodes being disposed internally of the reactor and being provided with an electrode tip within the said electrical discharge-zone, and the other electrode and its terminal being located externally to the reactor chamber centrally of its cooperating electrode terminal-member and spaced from the reactor wall whereby the discharge between said second pair of electrodes is drawn downwardly between the first pair of electrodes, means for supplying said first pair of electrodes with electrical energy of one frequency, and separate means for simultaneously supplying the second pair of electrodes with cyclic energy of another frequency.

3. The reactor apparatus of claim 1 wherein at least one electrode of one of said pairs of electrodes is provided with a sheath member and the means for supplying reacting material is provided by a conduit in operative connection with the sheath member, said electrode being provided with an electrode terminal and a plurality of passageways functioning to split the material being treated into a plurality of pencil-like streams to thereby insure intimate contact of the medium being treated with a generated composite discharge.

4. The reactor apparatus of claim 2 wherein at least one electrode of one of said pairs of electrodes is provided with a sheath member and the means for supplying reacting material is provided by a conduit in operative connection with the sheath member, said electrode being provided with an electrode terminal and a plurality of passageways functioning to split the material being treated into a plurality of pencil-like streams to thereby insure intimate contact of the medium being treated with a generated composite discharge.

5. In an electrode reactor apparatus adapted to effect electrochemical transformation of a gaseous material, a dielectric reactor having an electrical discharge-zone formed between its electrodes, each end of said reactor being adapted to support an electrode member, means for introducing reacting material into the reactor chamber, means for discharging transformed material from the reactor chamber, an insulated sheath support mounted interiorly of each of the ends of the reactor, a sheath member mounted in each of said insulating sheath supports, said sheath members being spaced from the interior wall of the reactor chamber, an insulating closure for the exterior end of each of said sheath members, a pair of opposing electrodes having electrode terminals disposed internally of the reactor chamber, one electrode being disposed within one sheath member and the other electrode within the opposing sheath member, each of said electrodes being supported by its respective sheath closure, a second pair of electrodes provided with electrode terminals cooperatively disposed with respect to the first pair of electrodes, at least one electrode thereof being located externally of the reactor and the other electrode and its terminal being oppositely disposed with respect thereto, said pairs of electrodes being disposed to provide for the electrical discharge between the second pair of electrodes crossing the electrical discharge between the first pair of electrodes, means for supplying said first pair of electrodes with cyclic energy of one frequency, and separate means for simultaneously supplying the second pair of electrodes with cyclic energy of another frequency.

6. In an electrode reactor apparatus adapted to effect electrochemical transformation of gaseous material, a dielectric reactor provided with a chamber having an electrical composite discharge-zone formed between its electrodes, means for introducing reacting material into the reacting chamber, means for discharging transformed material from the reactor chamber, a pair of electrodes including their discharge terminals disposed internally in said reactor chamber, a second pair of electrodes including their discharge terminals disposed externally to the reactor and spaced from the reactor chamber wall, said pairs of electrodes being transversely arranged with respect to each other to provide for the electrical discharge between the second pair of electrodes crossing the electrical discharge between the first pair of electrodes, means for supplying said first pair of electrodes with cyclic energy of one frequency, and separate means for simultaneously supplying the second pair of electrodes with cyclic energy of another frequency.

7. In an electrode reactor apparatus adapted to effect electrochemical transformation of a gaseous material, a dielectric reactor provided with a chamber having an electrical composite discharge-zone formed between its electrodes, means for introducing reacting material into the reactor chamber, means for discharging transformed material from the reactor chamber, a pair of electrodes including their discharge terminals disposed internally in said reactor chamber, a second pair of electrodes cooperatively disposed in a zone bounded by the terminals of said first pair of electrodes, one of said second pair of electrodes and its discharge terminal being located externally of the reactor, and the other electrode and its terminal being oppositely disposed with respect thereto, said pairs of electrodes being transversely arranged one with respect to the other to provide for the electrical discharge between the second pair of electrodes crossing the electrical discharge between the first pair of electrodes disposed internally of the reactor chamber, means for supplying said first pair of electrodes with cyclic energy of one frequency, and separate means for simultaneously supplying said second pair of electrodes with cyclic energy of another frequency.

8. In an electrode reactor apparatus adapted to effect electrochemical transformation of a gaseous material, a dielectric reactor provided with a chamber having an electrical composite discharge-zone formed between its electrodes, means for introducing reacting material into the reactor chamber, means for discharging transformed material from the reactor chamber, a pair of electrodes including their discharge terminals disposed internally in said reactor chamber, sheath members spaced from the wall of the reactor chamber and spaced from and surrounding each of said electrodes, a second pair of electrodes cooperatively disposed with respect to the first pair of electrodes, one of said second pair of electrodes and its discharge terminal being located externally of the reactor, and the other electrode and its terminal being oppositely disposed with respect thereto, said pairs of electrodes being disposed to provide for the electrical discharge between the second pair of electrodes crossing the electrical discharge between the first pair of electrodes disposed internally of the reactor chamber, means for supplying said first pair of electrodes with cyclic energy of one frequency, and separate means for simultaneously supplying said second pair of electrodes with cyclic energy of another frequency.

9. In an electrode reactor apparatus adapted to effect electrochemical transformation of a gaseous material, a dielectric reactor provided with a chamber having an electrical composite discharge-zone formed between its electrodes, means for introducing reacting material into the reactor chamber, means for discharging transformed material from the reactor chamber, a pair of electrodes including their discharge terminals disposed internally in said reactor chamber, sheath members spaced from the wall of the reactor chamber and spaced from and surrounding each of said electrodes, a second pair of electrodes cooperatively disposed with respect to the first pair of electrodes, one of said second pair of electrodes and its discharge terminal being located internally of the reactor and the other electrode and its discharge terminal being disposed externally to the reactor chamber, said external electrode terminal conforming substantially to the contour of the reactor wall and being spaced therefrom, the electrical discharge-axis between the first pair of electrodes crossing the electrical discharge-axis between the second pair of electrodes, means for supplying said first pair of electrodes with electrical energy of one frequency, and separate means for supplying the second pair of electrodes with cyclic energy of another frequency.

10. In an electrode reactor apparatus adapted to effect electrochemical transformation of gaseous material, a dielectric reactor provided with a reaction chamber having an electrical discharge-zone formed between its electrodes, means for introducing reacting material into the reactor chamber, means for discharging the transformed material from the reactor chamber, a pair of electrodes including their discharge terminals positioned internally in said reactor chamber, sheath members spaced from the wall of the reactor chamber and spaced from and surrounding each of said electrodes, a second pair of electrodes cooperativey disposed with respect to the first pair of electrodes, one of said second pair of electrodes being disposed internally of the reactor and provided with an electrode tip within the electrical discharge-zone, and the other electrode and its terminal being located externally to the reactor centrally of its cooperating electrode terminal member and spaced from the reactor wall whereby the discharge between said second pair of electrodes is drawn downwardly between the first pair of electrodes, means for supplying said first pair of electrodes with electrical energy of one frequency, and separate means for supplying the second pair of electrodes with cyclic energy of another frequency.

11. In an electrode apparatus adapted to effect electrochemical transformation of a gaseous material, a dielectric reactor provided with a chamber having an electrical composite discharge-zone formed between its electrodes, a pair of electrodes including their discharge terminals disposed internally in said reactor chamber, sheath members spaced from the wall of the reactor chamber and spaced from and surrounding each of said electrodes, one of said sheath members being provided with means for introducing the reacting material into the sheath member from which it passes to the reactor discharge-zone, the electrode surrounded by said sheath member being provided with an electrode terminal having a plurality of passageways functioning to split the material being treated into a plurality of pencil-like streams to thereby insure intimate contact of the material being treated with the generated composite electrical discharge, a second pair of electrodes cooperatively disposed with respect to the first pair of electrodes, one of said second pair of electrodes and its discharge terminal being located externally of the reactor, and the other electrode and its terminal being oppositely disposed with respect thereto said pairs of electrodes being disposed to provide for the electrical discharge between the second pair of electrodes crossing the electrical discharge between the first pair of electrodes disposed internally of the reactor chamber, means for supplying said first pair of electrodes with cyclic energy of one frequency, separate means for simultaneously supplying said second pair of electrodes with cyclic energy of another frequency, and means for discharging the transformed material from the reactor chamber.

12. In an electrode apparatus adapted to effect electrochemical transformation of a gaseous material, a dielectric reactor provided with a chamber having an electrical composite discharge-zone formed between its electrodes, a pair of electrodes including their discharge terminals disposed internally in said reactor chamber, sheath members spaced from the wall of the reactor chamber and spaced from and surrounding each of said electrodes, one of said sheath members being provided with means for introducing the reacting material into the sheath member from which it passes to the reactor discharge-zone, the electrode surrounded by said sheath member being provided with an electrode terminal having a plurality of passageways functioning to split the material being treated into a plurality of pencil-like streams to thereby insure intimate contact of the material being treated with the generated composite electrical discharge, a second pair of electrodes cooperatively disposed with respect to the first pair of electrodes, one of said pair of electrodes and its discharge terminal being located internally of the reactor, and the other electrode and its discharge terminal being disposed externally of said reactor chamber, said pair of electrodes being disposed to provide for the electrical discharge therebetween crossing the electrical discharge between the first pair of electrodes disposed internally of the reactor chamber, means for supplying said first pair of electrodes with cyclic energy of one frequency, separate means for simultaneously supplying said second pair of electrodes with cyclic energy of another frequency, and means for discharging the transformed material from the reactor chamber.

WILLIAM J. COTTON.

REFERENCES CITED

The following references are of record in the file of this patent:

UNITED STATES PATENTS

| Number | Name | Date |
|---|---|---|
| 546,702 | Koneman | Sept. 24, 1895 |
| 672,231 | Lacomme | Apr. 16, 1901 |
| 1,125,208 | Summers | Jan. 19, 1915 |
| 1,455,088 | McCabe | May 15, 1923 |
| 1,710,155 | Egloff | Apr. 23, 1929 |
| 2,106,780 | Whittier | Feb. 1, 1938 |
| 2,257,177 | Luster | Sept. 30, 1944 |
| 2,364,940 | Bies | Dec. 12, 1944 |